United States Patent [19]

Takahashi et al.

[11] Patent Number: 5,428,774
[45] Date of Patent: Jun. 27, 1995

[54] SYSTEM OF UPDATING AN INDEX FILE OF FRAME SEQUENCES SO THAT IT INDEXES NON-OVERLAPPING MOTION IMAGE FRAME SEQUENCES

[75] Inventors: Junichi Takahashi, Tokyo; Hideharu Hashihara, Yokohama, both of Japan

[73] Assignee: International Business Machines Corporation, Armonk, N.Y.

[21] Appl. No.: 33,686

[22] Filed: Mar. 16, 1993

[30] Foreign Application Priority Data

Mar. 24, 1992 [JP] Japan ................................. 4-065620

[51] Int. Cl.⁶ .............................................. G06F 17.30
[52] U.S. Cl. .................................... 395/600; 395/154; 360/14.1; 364/DIG. 1; 364/282.3; 364/282.1
[58] Field of Search .................. 395/600, 100, 154; 360/14.1

[56] References Cited

U.S. PATENT DOCUMENTS

| | | | |
|---|---|---|---|
| 4,937,743 | 6/1990 | Rassman et al. | 364/401 |
| 4,965,753 | 10/1990 | Kraemer | 395/121 |
| 4,979,050 | 12/1990 | Westland et al. | 360/14.1 |
| 5,182,677 | 1/1993 | Kizu et al. | 360/14.2 |
| 5,267,334 | 11/1993 | Normille et al. | 382/56 |
| 5,267,351 | 11/1993 | Reber et al. | 395/600 |
| 5,317,729 | 5/1994 | Mukherjee et al. | 395/600 |
| 5,339,166 | 8/1994 | Lebrat et al. | 358/311 |

OTHER PUBLICATIONS

Bassiouni, Proc. IEEE Compsac Conf., "A Logic for Handling Time in Temporal Databases", pp. 345–352.
Bassiouni et al, Proc. 13th Annual Computer Software and Applications Conference, Sept. 20–22 1989 pp. 201–208.

*Primary Examiner*—Thomas G. Black
*Assistant Examiner*—Wayne Amsbury
*Attorney, Agent, or Firm*—Perman & Green

[57] ABSTRACT

In the creation of the index file, one index record is allocated to each set consisting of one retrieval key and the initial and final positions in the motion image of one frame to which the retrieval key is allocated, and information on this set is stored therein. In the query processing, for a query specified by a Boolean expression of retrieval keys, records whose keywords match any of the retrieval keys included in the query are retrieved from the index file. Thereafter, all the initial and final positions of the matching records are arranged along a time axis. For each of intervals defined by those positions, a truth table is created in which the allocation of the retrieval keys included in the query is expressed by truth values, and the logical condition of the query is evaluated based on the table.

18 Claims, 14 Drawing Sheets

| CANDIDATE INTERVAL | [0,19] | [20,39] | [40,49] | [50,80] | [81,100] | [101,130] | [131,149] |
|---|---|---|---|---|---|---|---|
| K1 | F | T | T | T | T | T | F |
| K3 | F | F | F | T | T | F | F |
| K4 | F | F | T | T | F | F | F |
| P  | F | F | F | T | F | F | F |

| CANDIDATE INTERVAL | [150,159] | [160,169] | [170,180] | [181,220] | [221,230] | [231,300] |
|---|---|---|---|---|---|---|
| K1 | F | T | T | T | T | F |
| K3 | T | T | T | F | F | F |
| K4 | F | F | T | T | F | F |
| P  | F | F | T | F | F | F |

FIG. 15

| INITIAL POINT | FINAL POINT | KEYWORD LIST | | | | |
|---|---|---|---|---|---|---|
| 10 | 19 | K2 | | | | |
| 20 | 29 | K1 | K2 | | | |
| 30 | 39 | K1 | K2 | K5 | | |
| 40 | 49 | K1 | K2 | K4 | K5 | |
| 50 | 60 | K1 | K2 | K3 | K4 | K5 |
| 61 | 70 | K1 | K3 | K4 | K5 | |
| 71 | 80 | K1 | K3 | K4 | | |
| 81 | 89 | K1 | K3 | | | |
| 90 | 100 | K1 | K2 | K3 | | |
| 101 | 130 | K1 | K2 | | | |
| 131 | 139 | K2 | | | | |
| 140 | 149 | K2 | K5 | | | |
| 150 | 159 | K2 | K3 | K5 | | |
| 160 | 169 | K1 | K2 | K3 | K5 | |
| 170 | 180 | K1 | K2 | K3 | K4 | K5 |
| 181 | 190 | K1 | K2 | K4 | K5 | |
| 191 | 200 | K1 | K2 | K4 | | |
| 201 | 209 | K1 | K4 | | | |
| 210 | 220 | K1 | K2 | K4 | | |
| 221 | 230 | K1 | K2 | | | |
| 231 | 240 | K2 | | | | |

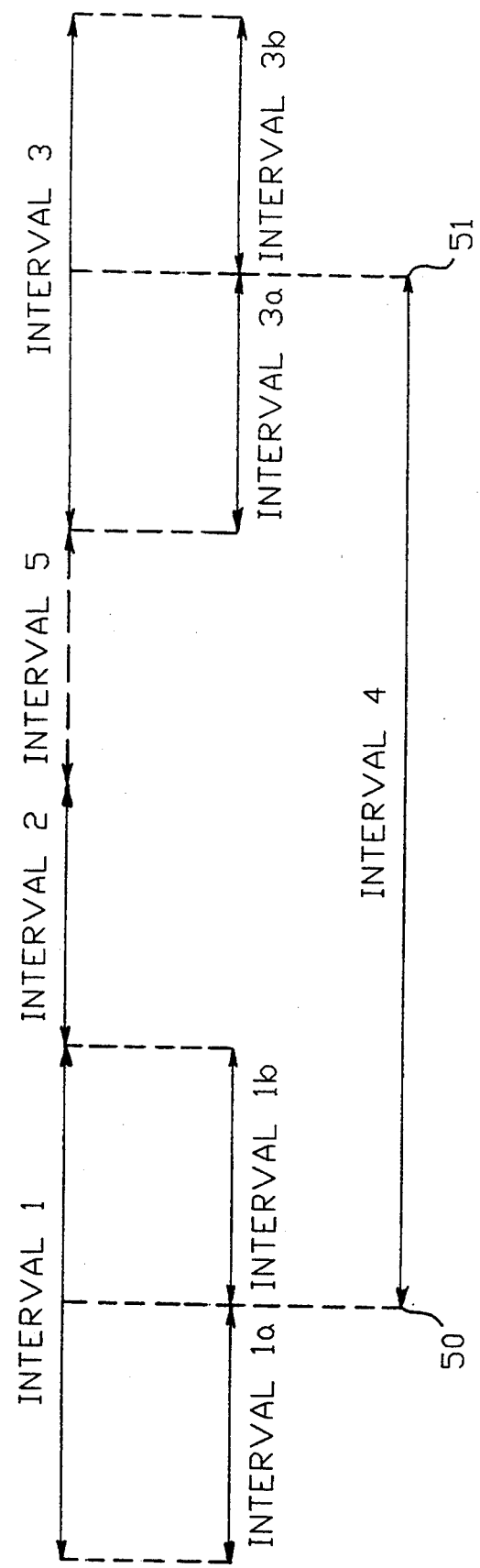

SYSTEM OF UPDATING AN INDEX FILE OF FRAME SEQUENCES SO THAT IT INDEXES NON-OVERLAPPING MOTION IMAGE FRAME SEQUENCES

DESCRIPTION

1. Technical Field

This invention is related to a method and system for allocating retrieval keys and creating an index file for frame sequences that constitute portions of a motion image. It is also related to a method and system for random retrieval of frame sequences from a motion image by means of retrieval keys.

2. Description of the Prior Art

Equipment for media on which motion images are recorded, such as laser disks, VTRs, and 8-mm videos, has become widely available, and the quantity of such images has been increasing rapidly, not only in media industries such as broadcasting centers and advertising companies, but also in museums, motion picture industries handling video films, and also in people's homes. If a motion image database contains a very large number of lengthy images, parts of which are sought for use in playback and authoring, it is difficult for a user to locate them in a short period of time; while sequentially playing back the whole image in real time. Thus there is a strong need for a motion image retrieval method that enables a desired scene to be located quickly.

Motion images consist of frames, or still images, that are, shown successively. Various objects appearing in a motion image, such as characters and backgrounds, usually remain in the image for a while once they have appeared in a certain frame, and may appear again at other times at varying intervals. In accordance with this phenomenon, in the method for retrieving a motion image described in Oomoto, E. and Tanaka, K., "A Video Object Model and Its Application to a Video Database System," IEICE Tech. Rep. Vol. 89, No. 466, 1990, pp. 33–40, attention is paid to frame sequences that constitute portions of a whole motion image. An object appearing in each frame sequence of interest is described by a keyword, and a frame sequence is retrieved by means of a retrieval key.

For instance, in the example shown in FIG. 1A and 1B, frame sequences A, B, and C are identified from frame sequence 1, which constitutes the whole motion image. For each identified frame sequence 2, records with fields for the identifier 3, the initial position 4 and the final position 5 in the motion image, and the keyword list 6 are stored in an index file 7.

The conventional method for creating index file 7 is described with reference to FIG. 2. First, the identifier, initial position s, and final position e of a frame sequence are received as input, and one or more keywords allocated to the frame sequence are sequentially received (steps 201, 202, 203). In this patent specification, an interval [s, e] defined by initial position s and final position e is simply referred to as an interval. When all the keywords have been received for one frame sequence, a record with field values for identifier, initial position s, final position e, and keyword list of the frame sequence is inserted into index file 7 (step 204). Subsequently, the process is repeated for other frame sequences (step 205). Index file 7 is maintained on a storage medium such as a magnetic disk or optical disk.

In the retrieval process, user-designated keywords are collated with keyword list 6 of index file 7. The frame sequences defined by the initial and final positions described in the collated records are the retrieval results, and the still images of the frames at the initial positions are presented to the user as the representative frames of the respective frame sequences. The user browses the still images and can view from the initial frame to the final frame of the frame sequence to verify the retrieval results.

In the conventional retrieval scheme, however, it is assumed that the frame sequences identified when an index file is created are subject to retrieval, and a retrieval condition is evaluated for fixed records in the index file. This scheme involves the following problems.

The first problem is that, if the interval recorded in the index file does not match the interval in which an object actually appears, the user must spend additional time playing back a motion image in real time to determine the actual interval. It may happen that, even if the initial and final positions of a frame sequence can be obtained by collation with the index file, the user requires only a portion of the retrieved frame sequence. If the retrieval result is a scene of several minutes and the scene required by the user occupies only a few seconds of it, he must spend several minutes playing back the whole scene in real time in order to find the few seconds of footage he wants.

Generally speaking, it is a characteristic of a motion image that if a plurality of objects appear in a particular frame, the initial and final frames of a frame sequence in which each object appears differ according to the object. In addition, if the same object appears continuously in a series of frames and if the semantics of a scene completely changes as a result of a change in the camera angle, panning, or zooming, the series of frames is often identified as a plurality of frame sequences in the creation of the index file. Accordingly, when new keywords are allocated to frame sequences, the intervals of the already identified frame sequence, are often inappropriate. If it is desired that an object corresponding to a keyword to be allocated should appear throughout a certain frame sequence, the existing frame sequences must be split again by reallocating the keywords in order to recreate the existing index file. This point will be described later when a comparative evaluation of this invention is made with reference to FIGS. 15 and 16.

The second problem is that a single scene expected by the user as a retrieval result may be split into several scenes, or that it may not be found at all. For instance, it is assumed theft keywords K1 and K2 are allocated to frame intervals x [10, 30] and y [20, 40], respectively. Since, for query K1&K2, K1 and K2 are not simultaneously allocated to x or y either, the result is null. Further, since for query K1 K2, at least one of K1 and K2 is allocated to both of x and y, the result includes both the records. That is, the scene [10, 40] expected as a result is split into two scenes. In the former query, the user would overlook the fact that interval [20, 30] satisfies the retrieval condition, and thus he must change the search condition and retrieve again. In the latter query, an overlapping frame interval is included in both the results. Consequently, the overlapping frame interval is played back twice when the two scenes are verified; this is redundant. If, for the second problem, the query processing method shown in Snodgrass, R., "The Temporal Query Language TQuel," ACM Transactions on Database Systems, Vol. 12, No. 2, June 1987, pp. 247–298, is used, correct frame intervals can be calculated by storing the index file as a relation in a relational database and matching the records in the index File with each other by means of a join operation. In the above example, the intervals ff10, 30″ and ff120, 40″ to which K1 and K2 are respectively allocated are compared and their overlapping intervals are calculated. In this scheme, however, the processing efficiency for accessing the index file and comparing frame intervals is a problem. That is, to detect the overlap of two intervals $I1=[s1, e1]$ and $I2=[s2, e2]$ in the join operation, $s1 \leq s2 \leq e1 \leq e2$ (the second half of I1 overlaps with the first half of I2), $s2 \leq s1 \leq e2 s1 \leq e1$ (the first half of I1 overlaps with the latter half of I2), $s1 \leq s2 \leq e2 \leq e1$ (I1 includes I2), and $s2 \leq s1 \leq e1 \leq e2$ (I2 includes I1) must all be evaluated as conditions. Suppose that n intervals are stored as records in a disk. The join operation in a nested-join method requires $n*n$ record accesses, and thus the processing time increases exponentially with the number of index file records to be compared. In addition, since it is necessary to refer simultaneously to the initial and final points of two intervals in order to evaluate the above conditions, a sort-merge method in which attribute values to be compared are sorted beforehand, or a hash-join method in which a hash function is applied to the attribute values to be compared cannot be employed as the join algorithm.

A join algorithm that is more efficient for evaluating the above-mentioned over-lapping conditions than the nested method is disclosed in Gunadhi, H. and Segev, A., "Query Processing Algorithms for Temporal Intersection Joins," Proc. of Seventh Int. Conf. on Data Engineering, IEEE, 1991, pp. 336–344. Multiple accesses to the same record are eliminated by creating two files in which the sets of records to be compared are respectively sorted in ascending order of their initial positions, and accessing and comparing the records of both from the top. However, this algorithm can process only the AND condition as a logical condition of query, and cannot be applied generally to logical conditions including OR and NOT. In addition, if three or more keywords are specified in a query, as in K1&K2&K3, it needs to be divided into two-keyword queries, such as (K1&K2)&K3, and the algorithm needs to be repeated, saving the intermediate result at each stage. As a result, the performance declines in proportion to the number of keywords specified in the query.

SUMMARY OF THE INVENTION

The primary object of this invention is to efficiently create an index file in which retrieval keys are allocated to frame sequences constituting portions of a motion image.

The secondary object of this invention is to reduce the number of accesses to the index file in order to make the query processing more efficient, thus enabling the user to verify the retrieval result efficiently.

It is a further object to efficiently create an index file in which retrieval keys are allocated to frame sequences constituting portions of a motion image. In addition, to reduce the number of accesses it is an object to the index file so that the query processing will be more efficient, and so that the, user can efficiently conform the retrieval results.

It is another object of this invention to provide flexible retrieval of frame sequences by means of retrieval keys and fast query processing for motion images.

As shown conceptually in FIG. 3, in accordance with this invention, when an index file is created, one index record is allocated to each set consisting of a retrieval key and the initial and final positions in a motion image of a frame sequence to which the retrieval key is allocated. The information on this set is then stored in the index record. Accordingly, as shown in FIG. 4, one record has information on one retrieval key. If a plurality of retrieval keys are allocated to the same frame sequence, one record is stored for each retrieval key. Furthermore, if the frame intervals designated for the same retrieval key overlap, the index file is updated so that one record is stored for an interval that spans all such intervals.

For a query specified by a Boolean expression in which a plurality of retrieval keys and logical operators such as AND and OR, are combined, the retrieval process extracts from the index file records that match any of the keys specified in the query. Thereafter, all the initial positions and final positions of the matched records are sequentially arranged along the time axis. For each of the intervals (candidate intervals) defined by these positions, a truth table is created that represents the allocation of the retrieval keys included in the query by true and false values, and the logical condition of the query is evaluated. The frame sequence for the resultant interval whose evaluation value is true is determined to be the retrieval result.

Independently of the creation of the above-mentioned index file, the entire motion image should preferably be uniquely split into partial frame sequences that have no overlapping intervals. For each partial frame sequence, a particular frame such as the initial frame is selected as the representative frame of the frame sequence, and a file for storing the still image of the representative frame is prepared. In response to the acquisition of the retrieval result, the representative frames included in the resultant intervals are presented to the user. The user browses the representative frames to verify the retrieval result.

BRIEF DESCRIPTION OF THE DRAWINGS

FIG. 1A and 1B is a conceptual diagram of the creation of a motion image index file according to the prior art;

FIG. 11 is a diagram showing a truth table for evaluating retrieval conditions;

FIG. 15 is a diagram showing a motion image index file created by the prior art; and FIG. 16 is a diagram showing allocation of keywords to frame sequences.

DESCRIPTION OF THE PREFERRED EMBODIMENT

Generally, the initial and final positions of a frame sequence are designated by the numbers uniquely provided to each frame included in a motion image. Accordingly, the initial and final positions are respectively denoted by the initial and final frame numbers in the following description. However, it should be noted that this invention is also applicable in the case where initial and final positions are designated by time codes. In this case, it is preferable that the time codes should have a one-to-one correspondence with frames. However, even if the accuracy of time codes is rough and the frames and time codes do not have a one-to-one correspondence (for example, if time codes are in seconds and 30 frames correspond to one second), an index file can be created and retrieved according to this invention.

Further, the creation and retrieval of an index file with keywords as retrieval keys are described below. This invention can also be applied to the case in which retrieval keys have attributes. In this case, one retrieval key consists of a pair of an attribute name and its value.

Figure 5:
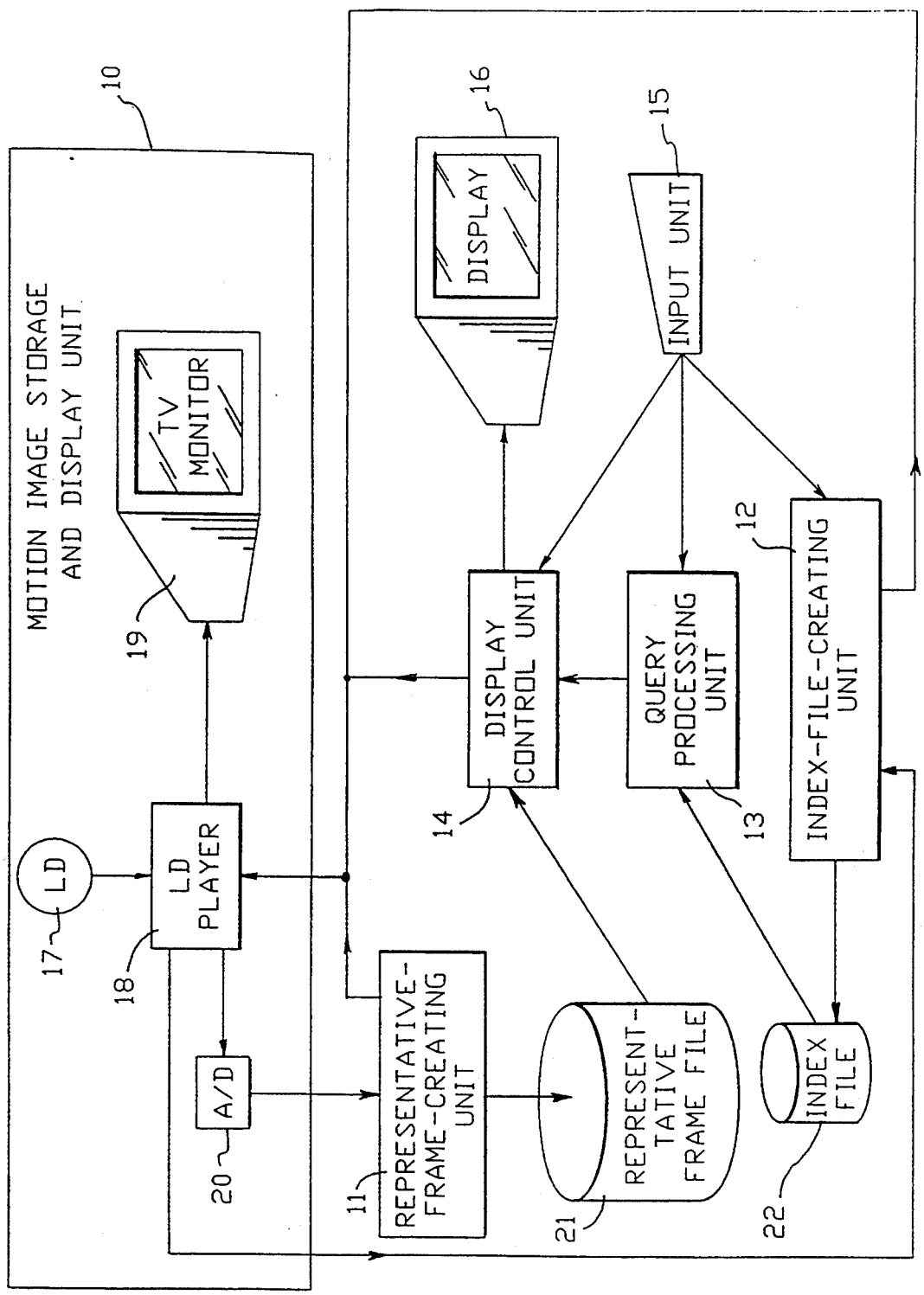
FIG. 5 is a diagram showing an example of the configuration of a motion image processing system incorporating this invention.

FIG. 5 shows an example of a motion image processing system incorporating this invention, where the system consists of a motion image storage and display unit 10, a representative-frame-creating unit 11, an index-file-creating unit 12, a query processing unit 13, a display control unit 14, an input unit 15, and a display 16.

Motion image storage and display unit 10 includes a laser disk (LD) 17 in which a motion image is stored as an analog image, a laser disk player (LD player) 18, a TV monitor 19 and a video signal converter 20.

Representative-frame-creating unit 11 controls motion image storage and display unit 10, receives successive digitized frame images from LD 17 through analog/digital converter 20, automatically detects scene changes on the basis of the physical changes in successive frames, and stores the still images of the changed frames and their frame numbers in a representative frame file 21 on a storage medium.

Index-file-creating unit 12 receives a keyword and the initial and final frame numbers of a frame interval to which the keyword is allocated, and stores the record in an index file 22. Keywords are directly supplied from input unit 15.

Index-file-creating unit 12 and LD player 18 are connected through an interface (not shown). In response to the input of the user's instructions from input unit 15, index-file-creating unit 12 issues instructions to LD player 18 to pause to acquire the current frame number. In response to these instructions, LD player 18 pauses during the motion image playback and displays the current still frame on monitor 19, as well as supplying the frame number of the still image to index-file-creating unit 12.

Query processing unit 13 receives from input unit 15 a query formulated as a Boolean expression of a plurality of keywords, reads index file 22, calculates the frame interval satisfying the query condition, and then outputs the initial and final frame numbers of the interval.

Display control unit 14 compares frame numbers of the frame interval output by the query processing unit with those stored in representative frame file 21, and shows on display 16 a list of the representative frames included in that interval. When one of the representative frames is selected by the user through input unit 15, display control unit 14 directs motion image storage and display unit 10 to play back a frame sequence including the selected representative frame.

Input unit 15 is typically a character and numeric input unit such as a keyboard, mouse, or touch panel.

In the above configuration, representative frame-creating unit 11, index-file-creating unit 12, query processing unit 13 and display control unit 14 are embodied by programs that implement the respective functions and a computer that runs the programs. A detailed description of the technique used by representative frame-creating unit 11 to detect scene changes is omitted, because a publicly known technique such as that given in Ioka, M., "A Method of Detecting Scene Changes in Moving Pictures," IBM TDB Vol. 34, NO. 10A, pp. 284-286, March 1992, can be used.

Figure 1B:
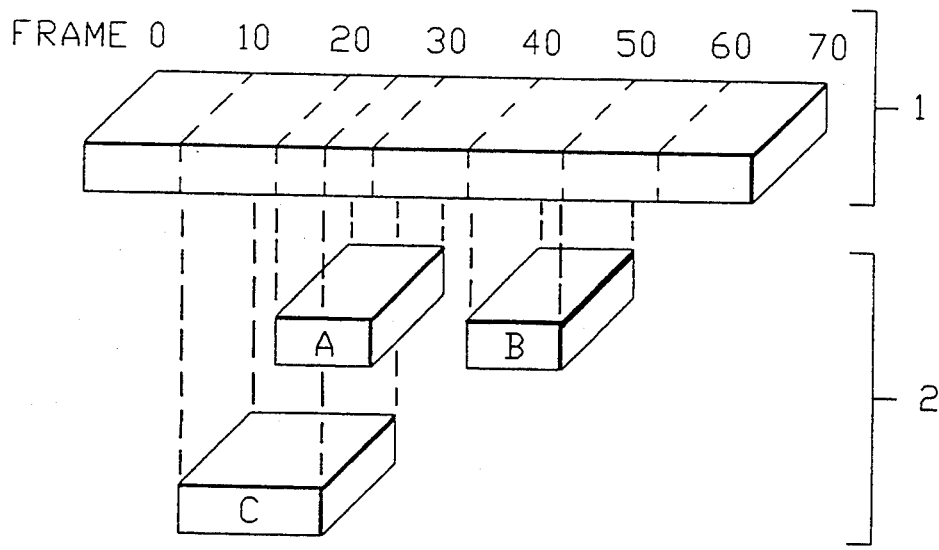
Figure 6:
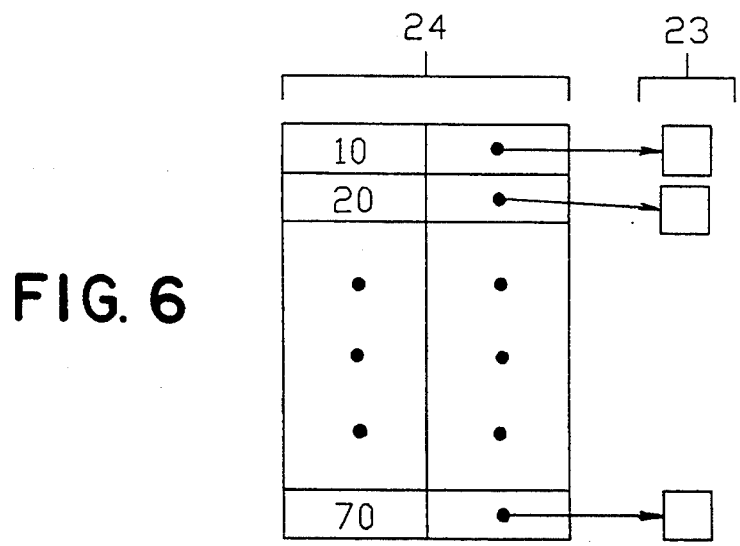
FIG. 6 is a diagram showing the structure of a representative frame file.

As shown in FIG. 6, representative frame file 21 consists of a set of still image files 23 of representative frames, and a file 24 for relating files 23 to frame numbers. File 24 has a frame number field and a field containing a pointer to still image file 23. Representative frame file 21 and index file 22 are usually stored in the main memory of a computer, or in a secondary storage device.

In the above description, motion image storage and display unit 10 may be replaced by a digital motion image database such as that disclosed in Published Unexamined Patent Application No. 1-224875. In this case, since analog/digital conversion is not required and a motion image can be displayed on display 16, video signal converter 20 and monitor 19 can be eliminated. Further, in a digital motion image database, a database management program and a computer that runs such a program are employed instead of LD player 18.

The key point of this invention consists of index-file-creating unit 12 and query processing unit 13. The details thereof and the procedure for retrieval are described below.

Figures 3, 4:
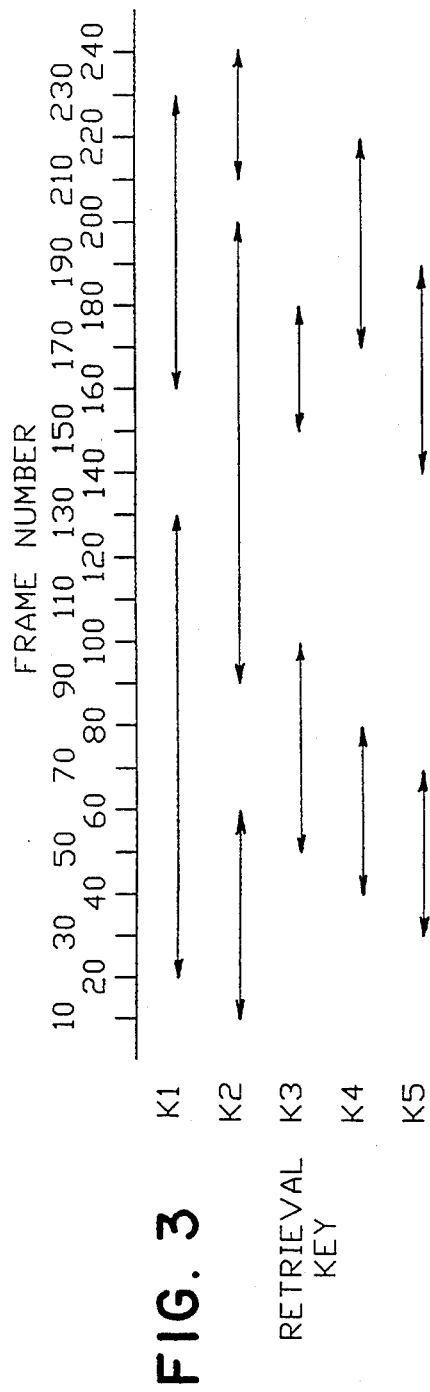
FIG. 3 is a conceptual diagram of retrieval key allocation to frame sequences according to this invention.
FIG. 4 is a diagram showing a motion image index file created by this invention.

Index-file-creating unit 12 receives as input a keyword and the initial and final frame numbers to which the keyword is allocated, and inserts into index file 22 a record whose construction is as shown in FIG. 4. However, for instance, if record (20, 40, K) is already stored and if keyword K is newly allocated to interval [30, 70], insertion of record (30, 70, K) causes redundant index information for interval [30, 40] to be held in two records. To avoid this, if overlapping intervals are selected for the same keyword K, the overlapping information is eliminated from the index file. In one method, the existing record (20, 40, K) is deleted and a new record (20, 70, K) is then inserted into the index file. Alternatively, the final frame number of the existing record (20, 40, K) is changed to 70. Similarly, if records (20, 40, K) and (60, 90, K) already exist, a new record (20, 90, K) is inserted after the two records have been deleted. Alternatively, the field value of one of the existing records is changed to create a new record (20, 90, K), and the other is deleted.

Figure 7:
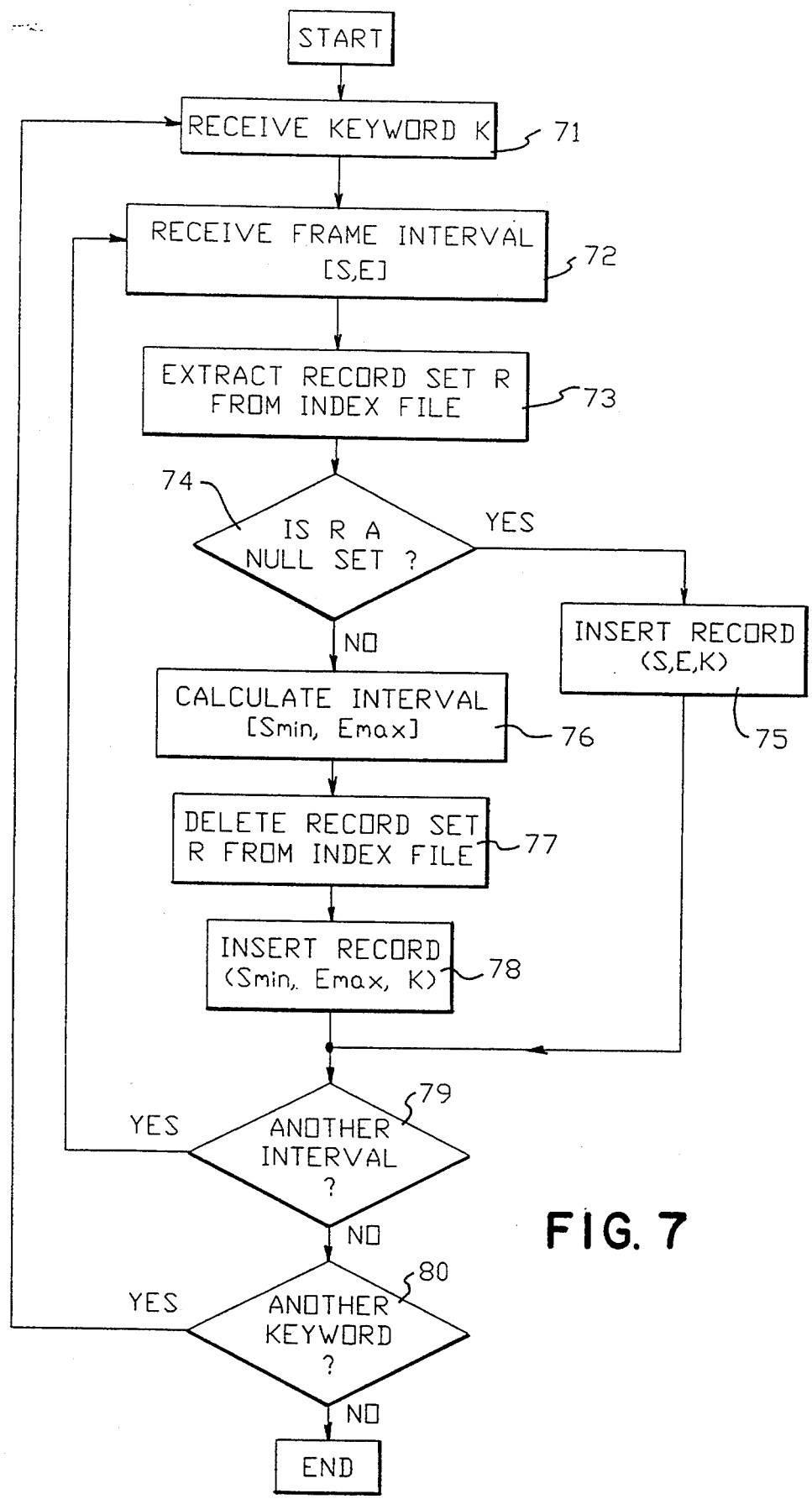
FIG. 7 is a flowchart depicting a first example of the creation of an index file according to this invention.

FIG. 7 depicts the flow of the process for creating an index file while performing the overlap checking described above. First, keyword K is received from input unit 15, and the frame interval [S, E] to which the keyword is allocated is also received (steps 71, 72). The keyword can be anything that expresses the attribute of the frame interval, such as the name of a character in that frame interval. The initial and final frame numbers of the frame interval are supplied from motion image storage and display unit 10 to index-file-creating unit 12 in response to instructions from input unit 15, as described above. Alternatively, if LD player 18 displays not only a motion image but also frame numbers on monitor 19, the user can operate LD player 18 to pause at a desired frame during playback of the motion image and can determine the number of the particular frame by means of monitor 19. Thus the user may use input unit 15 to input the initial and final frame numbers directly.

A set of records R having keyword K and intervals that at least partially overlap with the interval [S, E] (step 73) is then extracted from the existing index file. In this step, overlap of intervals is examined in a manner similar to that in the previous scheme described by Shodgrass et al. It should be noted, however, that since one of the intervals to be compared is set to the interval received in step 72, only "n" record accesses are needed, on the assumption that "n" intervals are stored in the index file.

If R is a null set, a record (S, E, K) having the designated initial frame number S, final frame number E, and keyword K as field values is inserted into the index file (steps 74, 75). If R is not a null set, the interval [Smin, Emax] defined by the minimum value of the initial frame numbers and the maximum value of the final frame numbers is obtained from an interval set including the intervals of the records belonging to R and the interval [S, E], and after the records belonging to R have been deleted, record (Stain, Emax, K) is inserted into the index file (steps 76 through 78). For another frame sequence, the above steps 72 through 77 are repeated (step 79). After keyword K has been allocated, the process is repeated for another keyword (step 80).

In addition, if instructions for releasing the allocation of keyword K to interval [S, E] are received from input unit 15, records that contain keyword K and whose intervals are included in interval [S, E] are deleted from the index file. Records that contain intervals intersecting with interval [S, E] are then processed. That is, for a record that contains an interval including the initial point S of interval [S, E], the final point of the particular interval is changed to S−1and for a record that contains an interval including the final point E, the initial point of the particular interval is changed to E+1. The index file may be updated by changing the field values of the existing records, or by deleting the existing records and then newly inserting records. The included records may be processed earlier than the intersecting records and vice versa.

Figure 8:
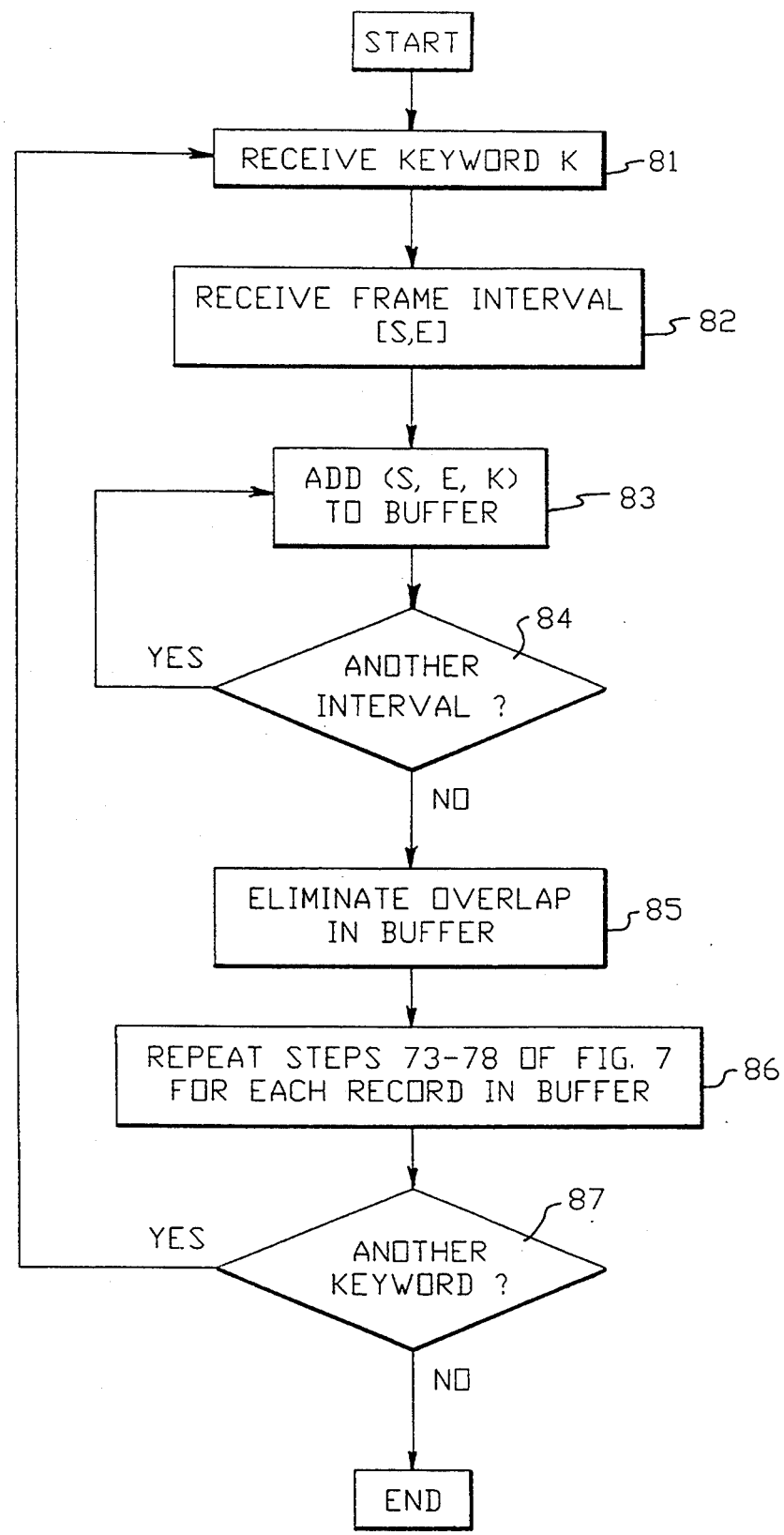
FIG. 8 is a flowchart depicting a second example of the creation of an index file according to this invention.

FIG. 8 depicts the flow for creating an index file efficiently in an interactive process when the index file is maintained in a secondary storage device of a computer. First, keyword K is received (step 81). Subsequently, record (S, E, K) is added to the buffer in the main memory each time the frame interval [S, E] to which the keyword is allocated is received (steps 82, 83, 84). When the intervals for keyword K have been designated, overlaps of the intervals defined by those records are checked and eliminated from the records in the buffer (step 85). The previous scheme described by Shodgrass et al. can be used for checking overlaps. The procedure for eliminating overlaps is the same as steps 76 to 78 of FIG. 7. Since the buffer can be accessed faster than the secondary storage device, overlaps in the buffer can be checked and eliminated at high speed. Finally, for each record in the buffer for which overlaps have been eliminated, steps 73 through 78 of FIG. 7 are repeated (step 86).

Figure 9:
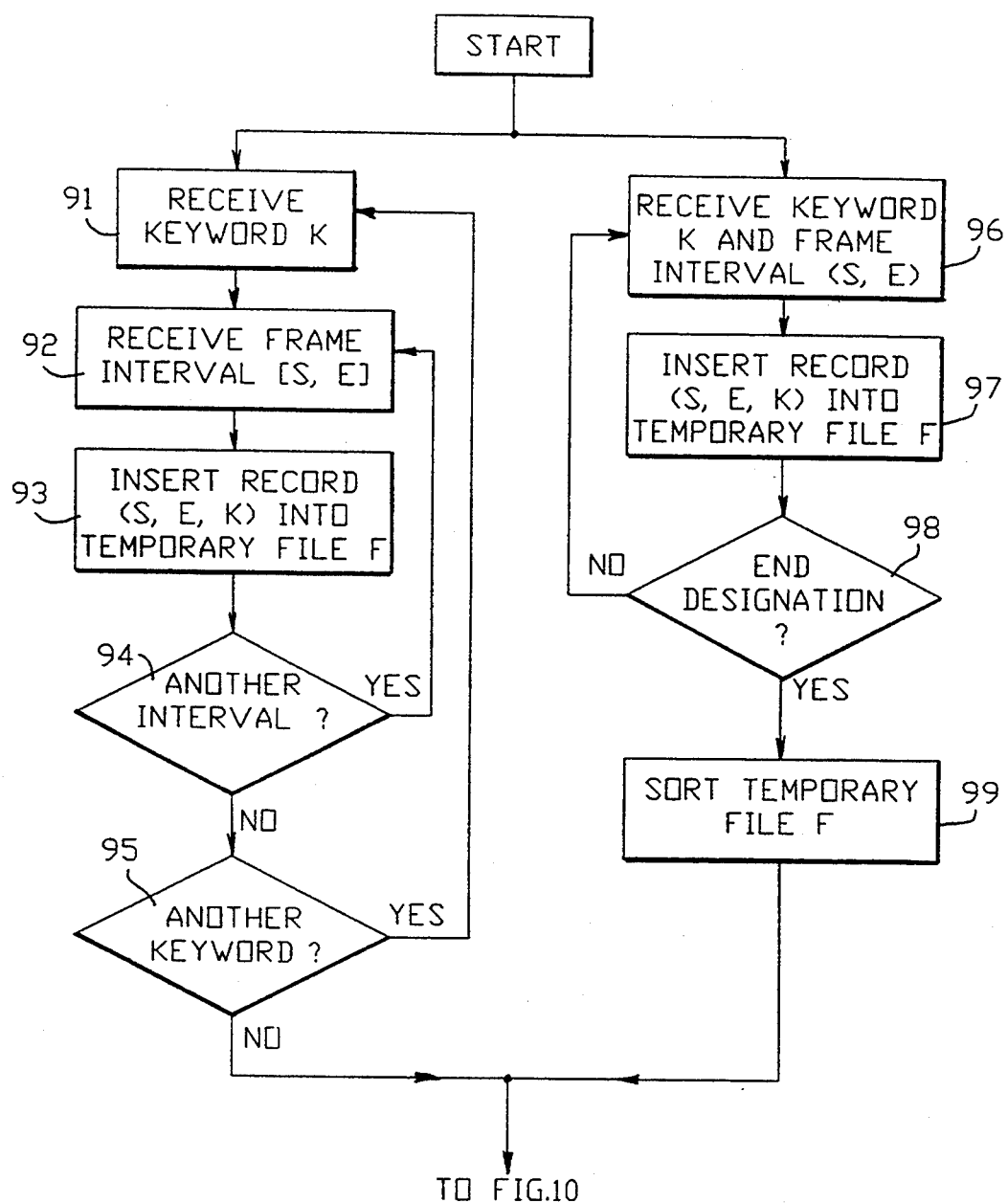
FIG. 9 is the first part of a flowchart depicting a third example of the creation of an index file according to this invention.
Figure 10:
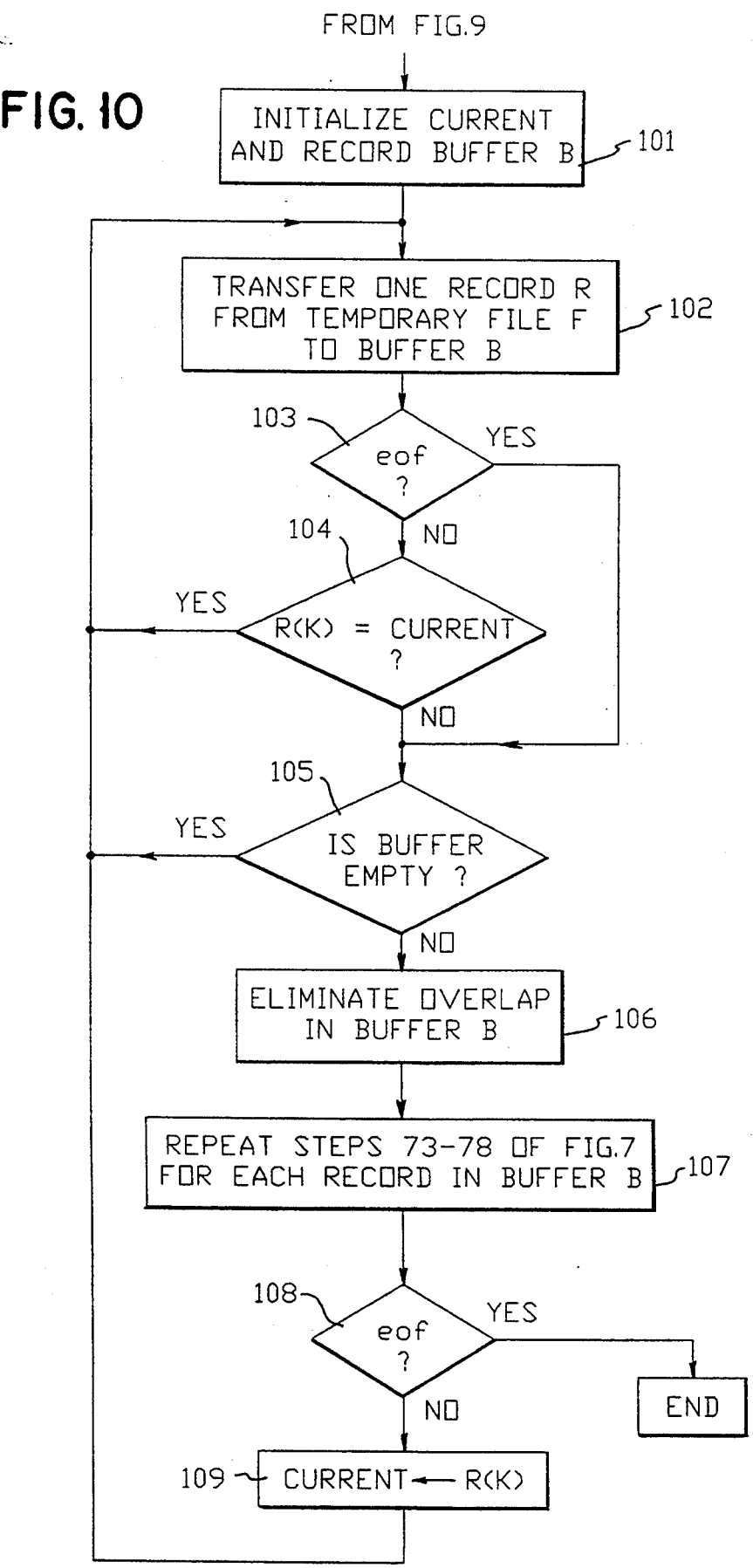
FIG. 10 is the second part of a flowchart depicting a third example of the creation of an index file according to this invention.

FIGS. 9 and 10 depict the flow for creating an index file efficiently in a batch process. First, a temporary file F is created, which contains a record (S, E, K) for a set consisting of the initial frame number S and final frame number E of a frame interval and the keyword K allocated to interval [S, E]. For the subsequent process to be performed efficiently, the temporary file F needs to be sorted in ascending order of keywords. A method for creating such a temporary file F is shown in steps 91-95 of FIG. 9. According to this method the keyword K is first received as input (step 91). Subsequently, for each time frame interval [S, E] is designated for the keyword, record (S, E, K) is inserted into the temporary file F (steps 92 through 94). When the end of processing for the interval for keyword K is signalled, the process is repeated for another keyword (step 95). Another method for creating the temporary file F is shown in steps 96 through 99 of FIG. 9. In this method, in response to the designation of a set consisting of the initial frame number S and final frame number E of a frame interval, and in response to the allocation of keyword K to interval [S, E], record (S, E, K) is inserted into the temporary file (steps 96 through 98). When the end of processing for the interval and the keyword is signalled, temporary file F is sorted by keyword (step 99). In addition, steps 96 through 98 may also be implemented by using an editor such as text editor to create a file that stores record (S, E, K).

FIG. 10 shows a method for creating an index file from temporary file F. The contents of the steps in FIG. 10 are now described.

[101] In the main memory of a computer, a variable current and a record buffer B are prepared and initialized. Here, the variable current holds one keyword, and record buffer B holds one or more records fetched from temporary file F.

[102] One record R is extracted from temporary file F and placed in buffer B.

[103] The process checks whether the end of temporary file F has been found. If so, the process skips to step 10; otherwise, it goes to step 104.

[104] The process checks whether keyword R. (K) of record R matches the value of the variable current. If so, the process returns to step 102; otherwise, it proceeds to step 105.

[105] The process checks whether buffer B is empty. If so, the process returns to step 102; otherwise, it proceeds to step 106.

[106] Overlaps of the intervals defined by the records in the buffer are eliminated as in step 85 of FIG. 8.

[107] For each record in the buffer for which overlaps have been eliminated, steps 73 through 78 of FIG. 7 are repeated.

[108] The process checks whether the end of temporary file F has been found. If so, the creation of the index file is terminated. Otherwise, the process proceeds to step 109.

[109] Keyword R (K) is assigned to the variable current.

As a whole, overlaps of intervals of records that contain the same keyword are eliminated in the buffer, and records are then inserted into the index file while overlaps are being eliminated.

Query processing unit 13 is now described. Query processing unit 13 receives a query Q (K1, K2, ..., Km) specified by a Boolean expression of m keywords Ki ($0 < i \leq m$), and outputs intervals satisfying the logical conditions of the query. The function is summarized by taking as an example the index file shown in FIG. 4 and query Q=K1&K3&K4.

First, from the index file, a record set RS whose keyword is either K1, K3, or K4 is searched for. The following interval set A is obtained:

A={[20, 130], [40, 80], [50, 100], [150, 180], [160, 230], [170, 220]}

Assume that the interval corresponding to the whole motion image is Z=[0, 300]. By sorting all the initial and final points of an interval set A and interval Z in ascending order, the following list of $|A|*2+2$ elements is obtained (where $|A|$ is the number of elements of set A):

0, 20, 40, 50, 80, 100, 130, 150, 160, 170, 180, 220, 230, 300

The i-th element of this list is termed L(i). $2*|A|+1$ intervals, I(i), are determined by the following expression:

I(i)=[L(i), L(i+1)]($1 \leq i \leq 2*|A|+1$)

However, if the initial point L(i) of interval I(i) is the final point of an interval that is an element of set. A, 1 is added to L(i). Similarly, if the final point L(i+1) is the initial point of an interval that is an element of set A, 1 is subtracted from L(i +1). In the example, the following 13 intervals are obtained:

[0, 19], [20, 39], [40, 49], [50, 80], [81, 100], [101, 130], [131, 149], [150, 159], [160, 169], [170, 180], [181, 220], [221, 230], [231, 300]

In each interval I(i), the truth value of the Boolean expression of the query does not change. With these intervals as candidate intervals, the Boolean expression of the query is then evaluated by creating a truth table (FIG. 11) in which the allocation of keywords included in the query is expressed by a truth value for each candidate interval. Intervals for which the evaluation result is true are determined to be retrieval results. In the truth table shown in FIG. 11, those intervals to which all the keywords K1, K3, and K4 are allocated are [50, 80] and [170, 180], and these intervals are determined to be the retrieval results of query Q.

Figure 12:
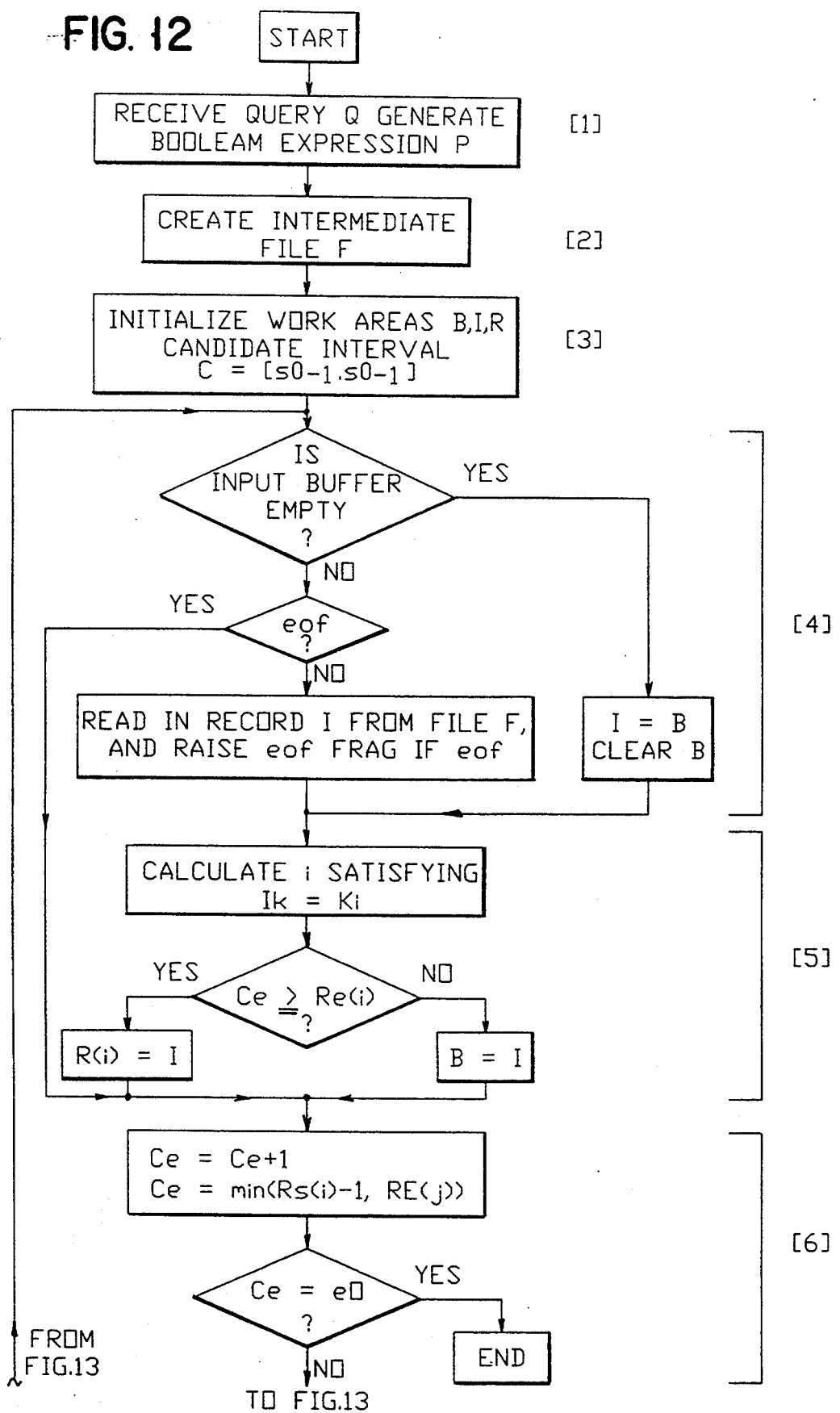
FIG. 12 is the first part of a flowchart depicting an example of frame sequence retrieval according to this invention.
Figure 13:
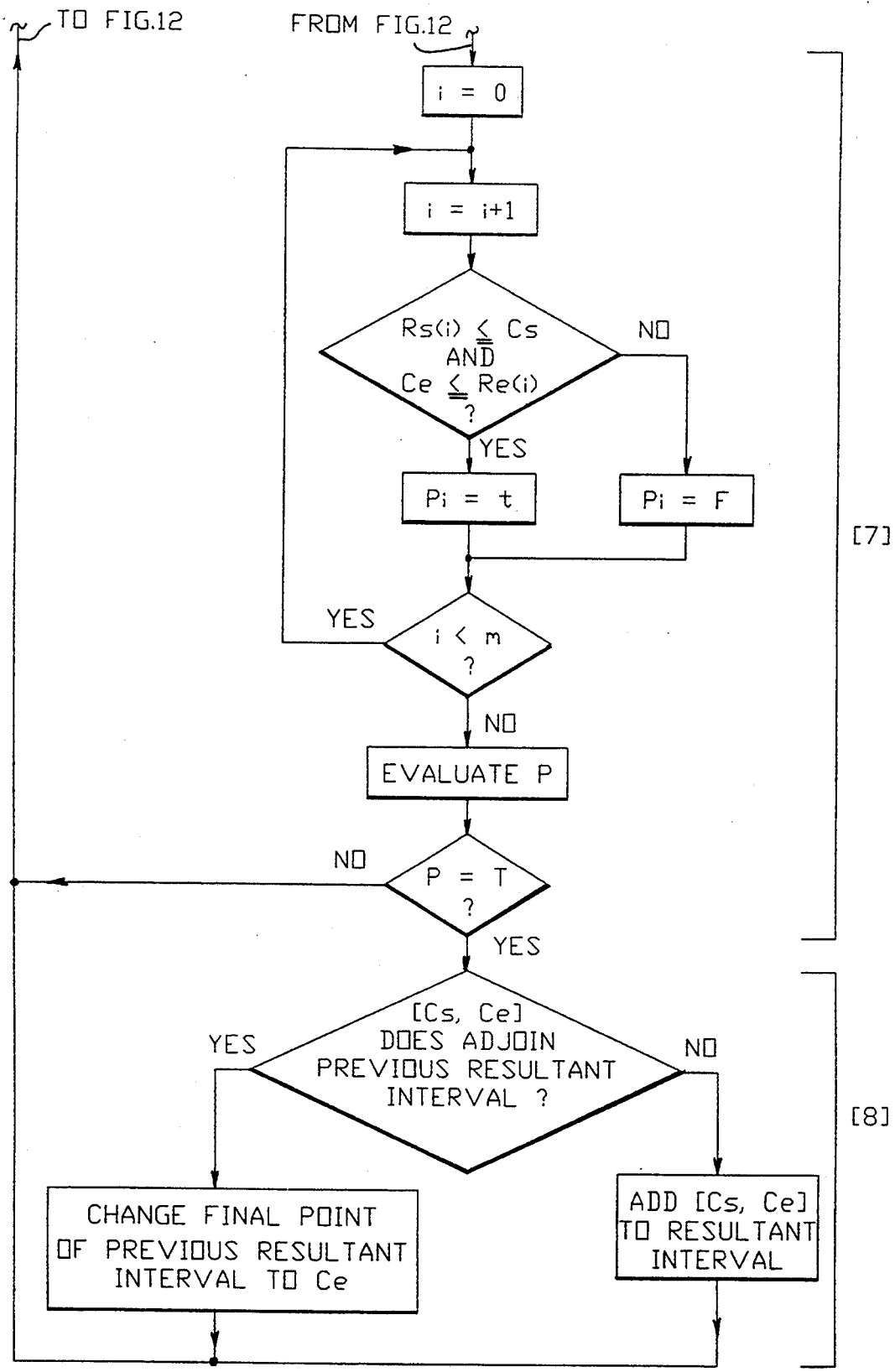
FIG. 13 is the second part of a flowchart depicting an example of frame sequence retrieval according to this invention.

FIGS. 12 and 13 show the details of the operation of query processing unit 13. First, to calculate the candidate intervals, the record set RS as described above is obtained, and an intermediate file, in which the set RS is sorted in ascending order of initial points, is temporarily created in the main memory of the computer or in a secondary storage device. While the intermediate file is being sequentially accessed from the first record, a plurality of consecutive candidate intervals in the whole interval Z=[s0, e0] are obtained, and the logical condition of the query is evaluated for each of them. The procedure is described below with reference to the flowchart.

[1] Receive query Q consisting of m keywords, and generate Boolean expression P(P1, P2, ..., Pro), in which each specified keyword Ki ($0 < i \leq m$) is replaced by logical variable Pi. For query Q=KI&K3&K4, Boolean expression P=P1&P3&P4 is generated.

[2] In the index file, search for records that have Ki as a keyword, and store the results in the intermediate file in ascending order of their initial frame numbers. Conventional methods such as the inverted file and B+-tree methods can be applied not only for this step but also for access to the index file. Sorting in this step is not required if the index file was previously sorted in order of the initial frame numbers.

[3] Prepare the following work areas in the main memory, and initialize them respectively. Set the entire interval Z to [s0, e0]. Candidate interval C is used as an area in which to maintain the interval [Cs, Ce] for which Boolean expression P is evaluated. Set its initial value to s0−1, e0-1]. Hereinafter the interval maintained in area C is referred to as candidate interval C. Input area I is used to hold a record (Is, Ie, Ik) read in from intermediate file F. Here, Is, Ie and Ik are the values of the initial frame number, final frame number, and keyword, respectively. m areas R(i) ($0 < i \leq m$) are used for keywords Ki, respectively. R(i) maintains the interval of the record read from file F as current interval [Rs(i), Re(i)] for Ki, which is referred to during the evaluation of Boolean expression P for candidate interval C. Input buffer B is used to save the record in input area I as (Bs, Be, Bk) temporarily if record interval [Is, Ie] of input area I comes after the interval of the current interval R(i) of keyword Ki.

[4] If input buffer B is empty, the process checks whether the end-of-file flag (eof) is raised. If so, the process skips to [6]. Otherwise, the following process is performed. If input buffer B is empty, read one record from file F into input area I. At this time, if there is no record to be read in, raise the eof flag. If input buffer B is not empty, move record <Bs, Be, Bk> in input buffer B to input area I and clear input buffer B.

[5] Obtain the value i that satisfies Ik=Ki, and compare the final point Ce of candidate interval C with Re(i). If Ce≦e(i), move the record in input area I into R(i); otherwise, save the record in input area I in input buffer B.

[6] Update the initial point Cs and final point Ce of candidate interval C according to the following expressions:

Cs=Ce+1

Ce=MIN(Ce, Rs(i)−1, Re(j))

i ∈{i|Rs(i)>Ce}, j∈{j|Re(j)>Ce}

The point next to final point Ce of current candidate interval C is selected as a new initial point. In addition, the new final point is the lowest number among those obtained by subtracting one from each of the initial points Rs(i) of the currently maintained m intervals and final points Re(i) that are larger than the final point Ce of the current candidate interval C. If the initial point Cs of the new candidate interval C becomes the final point e0 of the whole interval Z, the process terminates. If none of Rs(i) and Re(i) is larger than the current value of Ce, it is not updated.

[7] For each Ki, the process checks according to the following inclusion condition whether candidate interval C is included in the current interval [Rs(i), Re(i)] for Ki.

$$Rs(i) \leq Cs \text{ AND } Ce \leq Re(i)$$

If the candidate interval is included, it means that Ki is allocated to the candidate interval. Therefore, set the value of the corresponding logical variable Pi to T (true). Otherwise, set the value to F (false). Finally, evaluate the truth value of Boolean expression P; if it is F, the flow returns to [4].

[8] If the previously ,obtained resultant interval and candidate interval C are adjoining (that is, if the final point of the former is next to the initial point of the latter), the final point of the previous resultant interval is changed to the final point of candidate interval C. Otherwise, interval [Cs, Ce] is added to the resultant interval list and the process returns to step [4]

In the method for creating an index file shown in FIGS. 7 to 10, the step of eliminating overlapping intervals reduces the number of records in the intermediate file in the above query processing, and hence reduces the number of candidate intervals. They are effective in increasing the processing speed.

Figure 14:
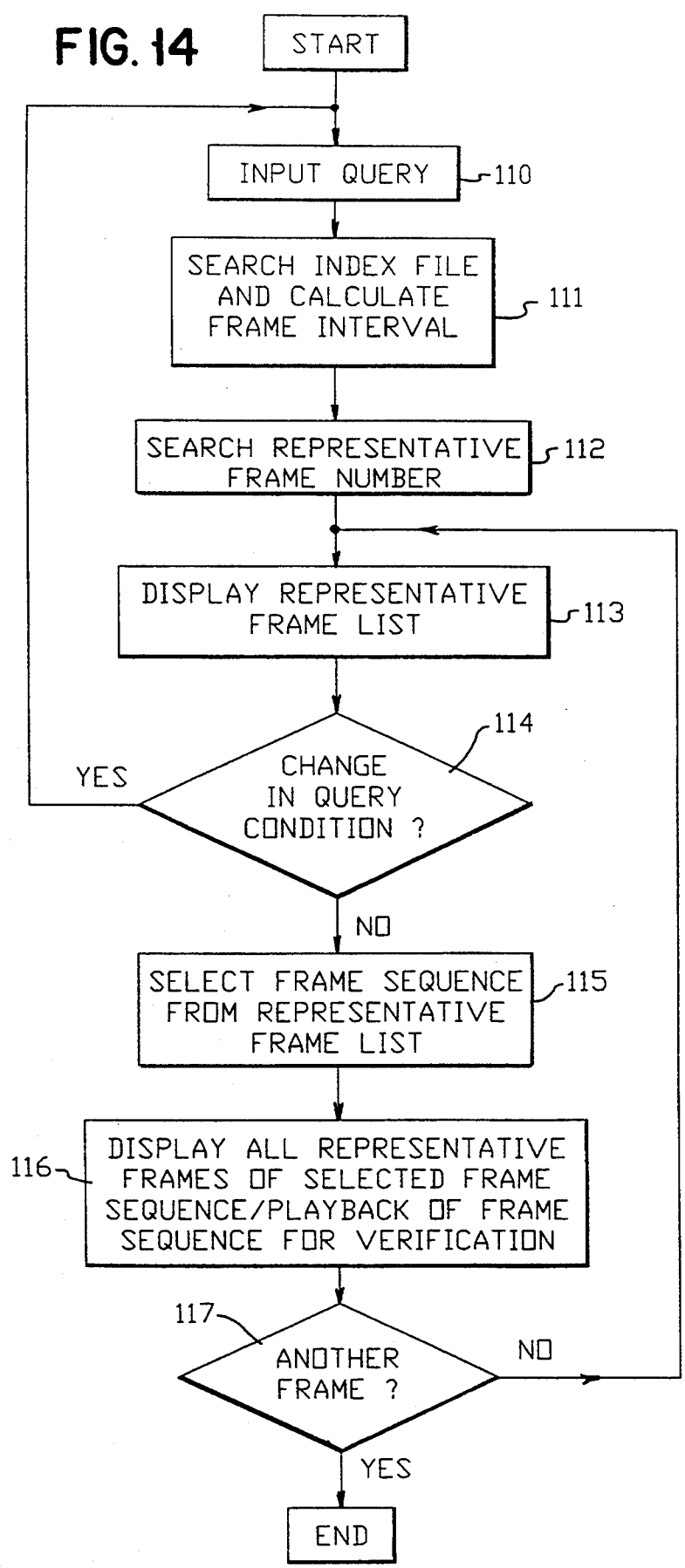
FIG. 14 is a flowchart showing the overall procedure of the retrieval work.

An example of the overall flow of the retrieval, including verification of the retrieval result, is described with reference to FIG. 14. First, the user inputs from input unit 15 a query consisting of a keyword and logical operators such as AND and OR in combination (step 110). Query processing unit 13 calculates a frame interval satisfying the query condition according to the procedure described above (step 111). Display control unit 14 compares the resultant interval with the frame numbers of the representative frames stored in representative frame file 21 to obtain the representative frame numbers included in the resultant interval, and displays a list of the representative frames on display 16 (steps 112, 113). If a plurality of representative frames are included in the resultant interval, the first representative frame, for example, in that interval is displayed.

If the number of retrieval results is too large or results are not found, the specified keyword and logical condition are changed and the retrieval process is repeated (step 114). If one of the representative frames is designated by the user, display control unit 14 displays all the representative frames of the resultant interval and buttons for playback control, such as search and freeze, on display 16. The user browses these representative frames and presses the playback control button to play back the motion images and verify the frame sequences (steps 115, 116). Steps 113 through 116 are iterated until the desired frame sequence has been confirmed (step 117).

Thus, the way of extracting images from representative frame file 21 and presenting them for user verification is effective when there is a high probability of the number of retrieval results becoming large. Of course, the user may confirm the retrieval results without using representative frame file 21. For instance, in the system shown in FIG. 5, when the user requests confirmation on monitor 19 through input unit 15, display control unit 14 may pass the initial frame numbers of the intervals that have been determined as retrieval results to motion image storage and display unit 10, and may display the initial frame numbers on monitor 19.

Figure 2:
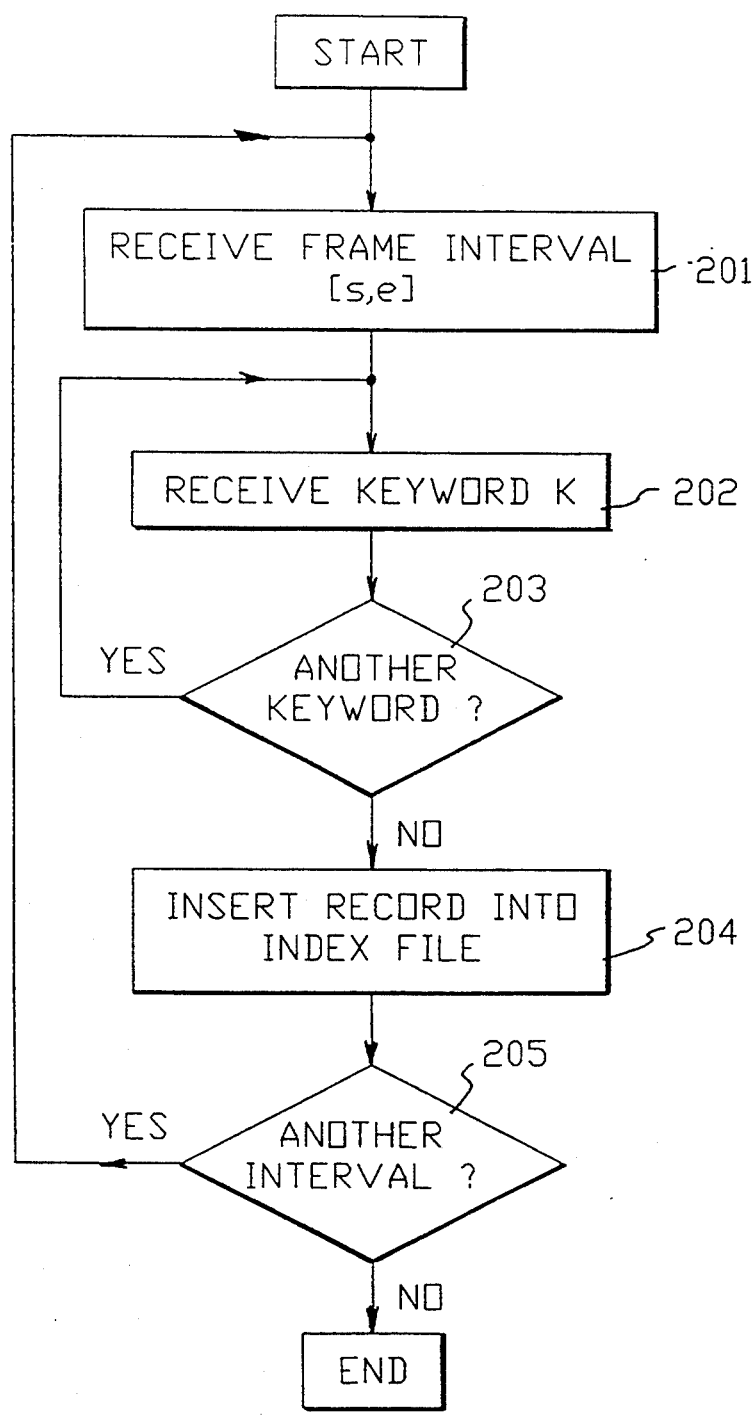
FIG. 2 is a flowchart depicting creation of a motion image index file according to the prior art.

The advantage of this invention over the prior art is described with respect to the efficiency of keyword allocation. In order to organize the index file by means of the method shown in FIG. 2 so that the objects corresponding to keywords appear throughout a frame sequence, it is necessary to store one record for each interval when the combination (list) of keywords vary by intervals. Accordingly, the more overlaps exist for the intervals to which the respective keywords are allocated, the greater the memory cost. For instance, if the user allocates keywords as shown in FIG. 3, the index file is created by the prior art as shown in FIG. 15. On the other hand, the index file created by this invention is as shown in FIG. 4.

In addition, if keywords are allocated to intervals that overlap the intervals to which keywords have already been allocated, it is necessary to split the overlapped intervals again and reallocate keywords, and thus the operation of updating the index file is complex and inefficient. For instance, suppose, in FIG. 16, that a keyword is allocated to interval 4 when keywords have already been allocated to intervals 1, 2, and 3. Since the initial point 50 of interval 4 is included in interval 1, it is necessary to delete the record corresponding to interval 1 and insert two records corresponding to intervals 1a and 1b in order to split interval 1 into two intervals 1a and 1b. Similarly, since the final point 51 of interval 4 is included in interval 3, it is necessary to delete the record corresponding to interval 3 and insert two records corresponding to 3a and 3b. Moreover, to allocate a keyword to interval 5, which is included in interval 4 and has no keyword allocated thereto, one record must be inserted. Moreover, one record must be updated in order to add a keyword to interval 2, which is included in interval 4 and to which keywords have already been allocated.

On the other hand, in the method for creating an index file in this invention, different keywords are independently allocated to two overlapping intervals. In the case of FIG. 16, it is only necessary to insert one record corresponding to interval 4, and thus the operation for the index file is simple and efficient.

Finally, the following table shows the result of an experiment comparing the method used in this invention with the prior art which is based on join operations in a relational database:, in terms of the processing speed of query processing. The experiment was conducted on an IBM 3081-KX3 running under VM/SP HPO5.0. The relationship between the number of records in the intermediate file and the response time is shown for three queries.

TABLE 1

| Response Time Comparison | | | | |
|---|---|---|---|---|
| | Records in index file | 472 | 944 | 1888 |
| Query | Records in intermediate file | 218 | 436 | 872 |
| Q1 = K1 & K2 | This invention | 7 | 14 | 27 |
| | Prior art | 10 | 29 | 99 |
| Q2 = K1/K2 | This invention | 7 | 14 | 27 |
| | Prior art | 12 | 37 | 137 |
| Q3 = K1 & K2 & K3 | This invention | 7 | 14 | 27 |
| | Prior art | N/A | N/A | N/A |

TABLE 1-continued

Response Time Comparison (Unit: sec)

The response time in the method used in this invention is approximately proportional to the number of records in the intermediate file created in procedure [2] of FIG. 12, regardless of the number of keywords specified in the queries and their logical condition. This is because the resultant interval is provided only by sequential access to the intermediate file.

In the prior art, in contrast, since the same record is accessed many times For matching of the index file, the efficiency rapidly declines as the number of records increases. Furthermore, in query Q3, interval overlap cannot be detected by a single join operation. Instead, first the retrieval result of K1&K2 is obtained, and then processing is performed to determine the overlap between the resultant interval and the interval to which K3 is allocated. Thus, if the condition in a query consists of three or more terms, it is divided into two conditions each of which has two terms, and the processing is nested. During the processing, the results of the join operation must be saved at each stage, which reduces the efficiency.

Having thus described our invention, what we claim as new and desire to secure by Letters Patents is:

1. A computer-implemented method for allocating retrieval keys to frame intervals that form portions of an entire sequence of frames that constitute a stored motion image and updating an index file of motion image frame intervals on a storage medium, said index file comprising records that contain information on initial and final positions of said intervals in said motion image as well as information on said retrieval keys, said method comprising the steps of:
   a. receiving as input a designation of one of said retrieval keys as a currently designated retrieval key;
   b. receiving as input a designation of initial and final positions of one of said intervals;
   c. extracting, from said index file, records that contain information on said currently designated retrieval key, in response to the designation of said initial and final positions;
   d. checking for the existence of any overlaps between said initial and final positions of said designated interval and the intervals defined by said extracted records;
   e. if any overlaps are detected in step (d), updating said index file so that it does not include any records associated with intervals that cause an overlap, but includes a record that contains information indicating initial and final positions of an interval that includes all the intervals that cause the overlaps, as well as information on the currently designated retrieval key;
   f. if no overlaps are detected in step (d), inserting into said index file a record that contains information on said designated initial and final positions as well as on said currently designated retrieval key; and
   g. iterating steps (b) through (f) until the designation of a new retrieval key is received as input.

2. A computer system for allocating retrieval keys to frame intervals that form portions of an entire sequence of frames that constitute a stored motion image and for updating an index file of motion image frame intervals on a storage device, said index file comprising records having information on initial and final positions of said intervals in said motion image as well as related information on said retrieval keys, said system comprising:
   a. buffer means for receiving as input a designation of one retrieval key as a currently designated retrieval key;
   b. means for receiving as input a record having a designation of initial and final positions of one of said frame intervals;
   c. means for adding records received by said receiving means having information on frame intervals with designated initial and final positions related to said currently designated retrieval key to said buffer means that can be accessed faster than said storage device;
   d. means for iterating the operation of said adding means until the addition of frame ,intervals for said currently designated retrieval key is complete; and
   e. means for updating the contents of said buffer means to eliminate any overlaps of intervals defined by records related to the same retrieval key in said buffer means, said updating means for each record in said buffer means comprising:
   f. means for extracting, from said index file, records that contain frame interval information on the same retrieval key as said each buffer record; means for checking for the existence of any overlaps
   g. means for checking for the existence of any overlaps between the initial and final positions of an interval defined by said each buffer record and intervals defined by said extracted index file records for the same retrieval key;
   h. means, responsive to the detection of any overlaps, for updating said index file so that it does not include any records related to the same retrieval key with intervals that cause an overlap, but includes a record that contains information indicating the initial and final positions of an interval that includes all the intervals that cause tile overlaps, as well as information on said same related retrieval key; and
   i. means, responsive to the detection of no overlaps for inserting said each buffer record into said index file.

3. A computer-implemented method for allocating retrieval keys to frame intervals that form portions of an entire sequence of frames that constitute a stored motion image and updating an index file of motion image frame intervals on an external storage device, said index file comprising records that contain information on initial and final positions of said intervals in said motion image as well as information on said retrieval keys, said method comprising the steps of:
   a. creating a temporary file in which records are sorted according to their retrieval keys, each record of which stores one keyword and information on initial and final positions of one interval to which said keyword is allocated;
   b. extracting, from said temporary file, records that contain identical keywords and placing them in a buffer that can be accessed faster than said external storage device;
   c. updating the contents of said buffer to eliminate any overlaps of initial and final positions of intervals defined by records in said buffer, said updating comprising for each record in said buffer, d. extracting, from said index file, records that contain information on an identical retrieval key as that of said buffer record;
e. checking for the existence of any overlaps between intervals defined by said buffer record and intervals defined by said extracted records;
f. if any overlaps are detected in step (e), updating said index file so that it does not include any records associated with intervals that cause an overlap, but includes a record that contains information indicating initial and final positions of an interval that includes all intervals that cause overlaps, as well as information on said identical retrieval key; and
g. if no overlaps are detected in step (e), inserting said buffer record into said index file.

4. A computer-implemented method for allocating retrieval keys of frame intervals that form portions of an entire sequence of frames that constitute a stored motion image and updating an index file of motion image frame intervals on a storage medium, said index file comprising records that contain information on initial and final positions of said intervals in said motion image as well as information on said retrieval keys, said method comprising the steps of:
a. receiving an instruction for release of a retrieval key allocation, wherein the instruction includes a retrieval key and initial and final positions of an interval as parameters;
b. extracting from said index file, records that contain information on said retrieval key of said instruction;
c. checking for the existence of any overlaps between intervals defined by said extracted records and said interval of said instruction;
d. if any intervals defined by said extracted records are completely included in said interval of said instruction, deleting records defining such intervals from said index file; and
e. if there are any overlaps between intervals defined by said extracted records and said interval of said instruction, updating said index file so that initial and final positions defining such intervals are changed so as to eliminate the overlaps.

5. A computer-implemented method for retrieving frame sequences, that constitute portions of a stored motion image, by the use of an index file maintained on a storage medium, wherein each record in said index file contains one keyword and information on initial and final positions in said motion image of one frame sequence interval for which said keyword is allocated, said method comprising the steps of:
a. receiving a query specified by a Boolean expression of retrieval keys related to said keywords;
b. extracting, from said index file, records that contain information with a keyword related to any retrieval key included in said query; and
c. dividing the whole interval of said motion image into a plurality of candidate intervals on the basis of initial and final positions stored in said extracted records and the initial and final positions of said whole interval of said motion image, and evaluating said Boolean expression according to whether a keyword related to a retrieval key has been allocated to each candidate interval to determine the candidate intervals to which all retrieval keys included in said query have been allocated.

6. A method as set forth in claim 5, wherein, in said index file, there are no overlaps between frame sequence intervals defined by initial and final positions of records that contain identical information on a keyword related to a retrieval key.

7. A method as set forth in claim 5, wherein, in step (c), the evaluation of said Boolean expression is sequentially performed for consecutive candidate intervals.

8. A computer system for retrieving records associated with frame sequences that constitute a motion image, said records being stored in an index file and each having a retrieval key and information on the initial and final positions of a respective frame sequence interval within the whole interval constituting said motion image, said system comprising:
a. means for inputting a record retrieving query specified by a Boolean expression of retrieval keys;
b. means for extracting, from said index file, records that contain information on any retrieval key included in said query; and
c. a means for dividing the whole interval constituting said motion image into a plurality of candidate intervals on the basis of initial and final positions stored in said extracted records and the initial and final positions of said whole interval constituting said motion image; and
d. query processing means for evaluating said Boolean expression according to whether a retrieval key has been allocated to each candidate interval and determining the candidate intervals to which all retrieval keys included in said query have been allocated, and including the records corresponding to said determined intervals in a retrieval result.

9. A system as recited in claim 8, further comprising:
means for storing and displaying a motion image; and
display control means for controlling said means for storing and displaying so as to display an image of at least one frame of a sequence included in an interval determined as a retrieval result by said query processing means.

10. A system as set forth in claim 8 further comprising:
a means for storing still images of representative frames in frame sequence intervals selected from the whole interval constituting said motion image;
a display control means; and
a display means; and
wherein said display control means extracts, from said means for storing still images of representative frames, still images of the representative frames included in an interval determined as a retrieval result by said query processing means and transfers them to said display means.

11. A computer-implemented method for creating an index file on a storage medium, said index file comprising index records for retrieving frame sequences that form portions of an entire sequence of frames that constitute a stored motion image, said method comprising the steps of:
creating frame sequence record sets, each record set comprising:
indices of the initial and final positions of the interval of a respective frame sequence in said sequence of motion image frames; and
a retrieval key allocated to the respective frame sequence;
allocating an index record to each record set and storing each set in said allocated index record;

storing said index records in said index file;

updating said index file by consolidating index records therein having record sets with the same retrieval key and indices defining initial and final positions which overlap, said consolidating comprising combining said record sets with overlapping indices into a single record set defining a frame sequence interval having initial and final positions indicative of the extremes of said indices.

12. A method as set forth in claim 11 further comprising the step of retrieving frame sequences from said index file using said retrieval keys to identify the index records sought.

13. A method as set forth in claim 12 wherein said retrieving step is achieved with Boolean logic.

14. A method as set forth in claim 12 wherein said retrieving step further comprises the steps of:

storing still images of representative frames in frame sequence intervals selected from the entire motion image sequence;

extracting from said stored still images, a still image of the representative frame in a retrieved frame sequence from said index records sought; and displaying said extracted still image.

15. A computer system for creating an index file on a storage medium, said index file comprising index records for retrieving frame sequences that form portions of an entire sequence of frames that constitute a stored motion image, comprising:

means for creating frame sequence record sets, each record set comprising:

indices of the initial and final positions of the interval of a respective frame sequence in said sequence of motion image frames; and a retrieval key allocated to the respective frame sequence;

means for allocating an index record to each record set and storing each set in said allocated index record;

means for storing said index records in said index file;

means for updating said index file by consolidating index records therein having record sets with the same retrieval key and indices defining initial and final positions which overlap, said updating means comprising:

means for combining said record sets with overlapping indices into a single record set defining a frame sequence interval having initial and final positions indicative of the extremes of said indices.

16. The system set forth in claim 15 further comprising means for retrieving frame sequences from said index file using said retrieval keys to identify the index records sought.

17. The system set forth in claim 16 wherein said retrieving means comprises means for executing Boolean logic.

18. The system set forth in claim 16 wherein said retrieving means comprises:

means for storing still images of representative frames in frame sequence intervals selected from the entire motion image sequence;

means for extracting from said stored still images, a still image of the representative frame in a retrieved frame sequence from said index records sought; and means for displaying said extracted still image.

* * * * *